US006048937A

United States Patent [19]

Bauer et al.

[11] Patent Number: 6,048,937

[45] Date of Patent: Apr. 11, 2000

[54] THERMOPLASTIC MOLDING COMPOUNDS BASED ON ETHYLENE POLYMERS AND THERMOPLASTIC POLYESTERS

[75] Inventors: Peter Bauer; Ursula Seeliger, both of Ludwigshafen; Uwe Faller, Frankenthal, all of Germany

[73] Assignee: BASF Aktiengesellschaft, Ludwigshafen, Germany

[21] Appl. No.: 09/000,342

[22] PCT Filed: Jul. 22, 1996

[86] PCT No.: PCT/EP96/03225

§ 371 Date: Jan. 20, 1998

§ 102(e) Date: Jan. 20, 1998

[87] PCT Pub. No.: WO97/06210

PCT Pub. Date: Feb. 20, 1997

[30] Foreign Application Priority Data

Aug. 4, 1995 [DE] Germany ........................... 195 28 647

[51] Int. Cl.[7] ...................................................... C08L 23/04

[52] U.S. Cl. .......................... 525/131; 525/167; 525/173; 525/174; 525/176; 525/177

[58] Field of Search .................................... 525/177, 176, 525/167, 173, 174, 131

[56] References Cited

U.S. PATENT DOCUMENTS

| | | | |
|---|---|---|---|
| 3,803,259 | 4/1974 | Porchey | 260/683 |
| 4,328,049 | 5/1982 | Richardson | 148/9 |
| 4,340,528 | 7/1982 | Marsh | 524/513 |

FOREIGN PATENT DOCUMENTS

| | | |
|---|---|---|
| 013 461 | 7/1980 | European Pat. Off. . |
| 93/08231 | 4/1993 | WIPO . |

OTHER PUBLICATIONS

Kunststoff–Handbuch Bd 3/1, 1992, pp. 15–23.

Fortunato et al., *Polymer,* vol. 25, No. 18, pp. 4006–4010, 1994.

*Primary Examiner*—Patricia A. Short

*Attorney, Agent, or Firm*—Keil & Weinkauf

[57] ABSTRACT

Thermoplastic molding materials contain, as essential components,

A) from 95 to 99.99% by weight of an ethylene polymer and

B) from 0.01 to 5% by weight of a thermoplastic polyester having a maximum melting point of less than or equal to 150° C.

14 Claims, No Drawings

THERMOPLASTIC MOLDING COMPOUNDS BASED ON ETHYLENE POLYMERS AND THERMOPLASTIC POLYESTERS

The present invention relates to thermoplastic molding materials containing, as essential components, A) from 95 to 99.99% by weight of an ethylene polymer and B) from 0.01 to 5% by weight of a thermoplastic polyester having a maximum melting point of less than or equal to 150° C.

The present invention furthermore relates to processes for the preparation of these thermoplastic molding materials, their use for the production of fibers, films and moldings, and the fibers, films and moldings obtainable thereby and comprising the thermoplastic molding materials.

It is known that the processability of ethylene polymers can be improved by admixing small amounts of fluorine-containing polymers, such as polyvinylidene fluorides. However, the disadvantage here is that fluorine is contained in the end product and the fluorine elastomers are present as particles in the finished article and cause problems, for example during printing.

It is an object of the present invention to provide thermoplastic molding materials which are based on ethylene polymers, do not have the stated disadvantages and exhibit good processability and good surface properties.

We have found that this object is achieved by the thermoplastic molding materials defined at the outset.

We have also found processes for their preparation, their use for the production of fibers, films and moldings, and the fibers, films and moldings obtainable thereby.

The novel thermoplastic molding materials contain, as component A), from 95 to 99.99, preferably from 97 to 99.95, in particular from 99 to 99.9, % by weight of an ethylene polymer. This is understood as meaning homopolymers or copolymers of ethylene, preferably used comonomers being propylene, butenes, pentenes, including 4-methylpent-1-ene, and hexenes. However, higher alkenes, in particular alk-1-enes, such as oct-1-ene, may also be used as monomers for copolymers. Blends of different ethylene polymers may also be used. A part of the blends may also consist of polyolefins having polar comonomers and obtained by free radical polymerization.

There are virtually no restrictions with regard to the density of the ethylene polymers; it may vary within wide ranges, for example from 0.860 to 0.970 g/cm$^3$. Particularly preferred ethylene polymers are those which have a very low density (ULDPE), which is generally from 0.880 to 0.910 g/cm$^3$, those having a low density (LDPE), which is generally from 0.910 to 0.935 g/cm$^3$, and those having a medium to relatively high density.

The molecular weight distribution ($M_w/M_n$) of the ethylene polymers used may also vary within wide ranges, for example from less than 2 to more than 30, an $M_w/M_n$ of less than 16 being preferred.

The melt flow rates (MFR) of the ethylene polymers used may also vary within wide ranges, for example from less than 0.01 to 80 g/10 min (190/2.16).

Furthermore, there are virtually no restrictions with regard to the processes for the preparation of the ethylene polymers, preparation preferably being effected using Ziegler, Phillips or metallocene catalyst systems.

The novel thermoplastic molding materials contain, as component B), from 0.01 to 5, preferably from 0.05 to 3, in particular from 0.1 to 1, % by weight of a thermoplastic polyester having a maximum melting point of less than or equal to 150° C.

Preferred components B) are polyesters which are obtainable by reacting a mixture containing, as essential components, B1) from 30 to 60, preferably from 32 to 55, % by weight of a mixture containing, as essential components, B11) from 30 to 70, preferably from 35 to 60, % by weight of adipic acid or ester-forming derivatives thereof, in particular di-$C_1$–$C_6$-alkyl esters, such as dimethyl, diethyl, dipropyl, dibutyl, dipentyl or dihexyl adipate, or a mixture thereof, preferably adipic acid or dimethyl adipate or a mixture thereof, B12) from 30 to 70, preferably from 35 to 60, % by weight of terephthalic acid or ester-forming derivatives thereof, in particular di-$C_1$–$C_6$-alkyl esters, such as dimethyl, diethyl, dipropyl, dibutyl, dipentyl or dihexyl terephthalate or a mixture thereof, preferably terephthalic acid or dimethyl terephthalate or a mixture thereof, and B13) from 0 to 5, preferably from 0.01 to 3, % by weight of a compound having at least three, preferably from three to ten, in particular from three to six, groups capable of ester formation, preferably hydroxyl and/or carboxyl, B2) from 40 to 70, preferably from 42 to 65, % by weight of a dihydroxy compound of 2 to 10 carbon atoms, preferably $C_2$–$C_6$-alkanediols or $C_5$–$C_{10}$-cycloalkanediols or a mixture thereof, and B3) from 0 to 5, preferably from 0.01 to 3, % by weight of diisocyanates, divinyl ethers, 2,2'-bisoxazolines or a mixture thereof.

The percentages by weight of the components B11), B12) and B13) are based on B1); the percentage by weight is to be understood in such a way that the sum of the percentages by weight of the components used is 100.

Examples of preferred components B13) are tartaric acid, citric acid, malic acid;

trimethylolpropane, trimethylolethane;

pentaerythritol;

polyether triols;

glycerol;

trimesic acid;

trimellitic acid, trimellitic anhydride;

pyromellitic acid, pyromellitic dianhydride and hydroxyisophthalic acid.

Examples of preferred components B2) are ethylene glycol, 1,2-and 1,3-propanediol, 1,2- and 1,4-butanediol, 1,5-pentanediol and 1,6-hexanediol, in particular ethylene glycol, 1,3-propanediol and 1,4-butanediol, cyclopentanediol, 1,4-cyclohexanediol, 1,2-cyclohexanedimethanol, 1,4-cyclohexanedimethanol and mixtures thereof.

Conventional and commercial diisocyanates may be used as diisocyanates (B3)). A diisocyanate which is selected from the group consisting of tolylene 2,4-diisocyanate, tolylene 2,6-diisocyanate, diphenylmethane 4,4'- and 2,4'-diisocyanate, naphthylene 1,5-diisocyanate, xylylene diisocyanate, hexamethylene diisocyanate, isophorone diisocyanate and methylenebis(4-isocyanatocyclohexane) is preferably used, particularly preferably hexamethylene diisocyanate.

In principle, trifunctional isocyanate compounds which may contain isocyanurate and/or biuret groups having a functionality of not less than three may also be used, or some of the diisocyanate compounds B3) may be replaced by tri- or polyisocyanates.

All conventional and commercial divinyl ethers may be used as divinyl ethers (B3)). Divinyl ethers selected from the group consisting of 1,4-butanediol divinyl ether, 1,6-hexanediol divinyl ether and 1,4-cyclohexanedimethanol divinyl ether are preferably used.

Compounds of the formula

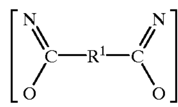

where $R^1$ is a single bond, a $(CH_2)_q$-alkylene group, in which q is 2, 3 or 4, or phenylene, may be used as 2,2'-bisoxazolines (B3)).

It is also possible to use polyesters B) in which a part of the components B11) and/or B12) has been replaced by aminocarboxylic acids, such as glycine, aspartic acid, glutamic acid, alanine, valine, leucine or isoleucine, and oligo- or polymers obtainable therefrom, such as imides of polyaspartic acid or imides of polyglutamic acid, preferably glycine. Instead of aminocarboxylic acids, polyamides having a molecular weight of not more than 18,000 g/mol, for example polyamide 46, polyamide 66 or polyamide 610, may also be used.

Polyesters B) in which either the amount of B13) is greater than 0% by weight or the amount of B3) is greater than 0% by weight or both the amount of B13) and the amounts of B3) are greater than 0% by weight are particularly preferred.

The polyesters B) preferably have a maximum melting point of from 40 to 150° C., particularly preferably from 60 to 140° C., in particular from 80 to 130° C.

The number average molecular weights $M_n$ of the polyesters B) may be from 2,000 to 100,000, preferably from 4,000 to 80,000, in particular from 5,000 to 50,000.

Processes for the preparation of the polyesters B) are not critical per se. All components may be reacted together or some of the components may be premixed. Basic processes are described, for example, in Kunststoff-Handbuch, Volume 3/1 (1992), pages 15 to 23, Carl Hanser Verlag, Munich.

For example, the reaction of dimethyl esters of component B1) with component B2) (transesterification) can be carried out at from 160 to 230° C. in the melt at atmospheric pressure, advantageously under an inert gas atmosphere.

In the preparation of the polyesters B), a molar excess, based on the component B1), of component B2) is advantageously used, for example up to 2 ½ times, preferably up to 1.67 times.

The preparation of the polyesters B) is usually carried out with the addition of suitable catalysts known per se, such as metal compounds based on elements such as Ti, Ge, Zn, Fe, Mn, Co, Zr, V, Ir, La, Ce, Li and Ca, preferably organometallic compounds based on these metals, such as salts of organic acids, alkoxides, acetylacetonates and the like, particularly preferably based on zinc, tin and titanium.

When dicarboxylic acids or anhydrides thereof are used as component B1), their esterification with component B2) can take place before, simultaneously with or after transesterification. In a preferred embodiment, the process for the preparation of modified polyalkylene terephthalates, which is described in DE-A 23 26 026, is used.

After the reaction of the components B1) and B2), the polycondensation to the desired molecular weight is carried out as a rule under reduced pressure or in an inert gas stream, for example comprising nitrogen, with further heating to 180–260° C., and component B3) is added.

In order to avoid undesirable degradation and/or secondary reactions, stabilizers may also be added, if desired, in this process stage. Such stabilizers are, for example, the phosphorus compounds described in EP-A 13 461 or U.S. Pat. No. 4,328,049 or in B. Fortunato et al., Polymer, Vol. 35, No. 18, pages 4006 to 4010, 1994, Butterworth-Heinemann Ltd. Some of these may also act as deactivators of the catalysts described above. Examples are organophosphites, phosphonous acid and phosphorus acid. Examples of compounds which act only as stabilizers are trialkyl phosphites, triphenyl phosphite, trialkyl phosphates, triphenyl phosphate and tocopherol (vitamin E; for example available as Uvinul® 2003AO (BASF)).

The weight ratio of catalyst to polyester B) is usually from 0.01:100 to 3:100, preferably from 0.05:100 to 2:100, and smaller amounts, such as 0.0001:100, may also be used in the case of highly active titanium compounds.

The catalyst may be used directly at the beginning of the reaction, just before the excess diol is separated off or, if desired, also divided into a plurality of portions during the preparation of the polyesters B). If desired, different catalysts or mixtures thereof may also be used.

A particularly preferred preparation of the polyesters B) is carried out by a procedure in which a prepolymer is first prepared from the component B11) and the component B2), and this prepolymer is then reacted with the component B12) and further B2) and with the component B13), and B3) is then added. In the preparation of the prepolymer, water and the excess of B2) and, for example, methanol are preferably distilled off.

The preparation of the novel thermoplastic molding materials is not critical per se. Preferably, the two components A) and B) are mixed at from 100 to 350° C, in particular from 150 to 260° C.

The novel thermoplastic molding materials are suitable for the production of fibers, films and moldings, in particular of films, profiles and hollow articles. They have in particular good processability and good surface properties.

EXAMPLES

The following components were used:

PE1: An ethylene copolymer containing 7% by weight of but-1-ene and having a molecular weight distribution $M_w/M_n$ of 4 ($M_w$≙weight average, $M_n$≙number average), a melt flow rate MFR (190/2.16) of 1 g/10 min and a density of 0.920 g/cm$^3$.

PE2: An ethylene copolymer containing 10% by weight of but-1-ene and having a molecular weight distribution of 2, a melt flow rate of 1.8 g/10 min and a density of 0.902 g/cm$^3$.

PE3: An ethylene copolymer containing 1.5% by weight of hex-1-ene and having a molecular weight distribution of 15, a melt flow rate 190/21,6 of 6 g/10 min and a density of 0.946 g/cm$^3$.

B: A polyester which was prepared as follows:

Prepolymer 4,672 kg of 1,4-butanediol, 7,000 kg of adipic acid and 50 g of tin dioctoate were heated to 240° C. under a nitrogen atmosphere. After the principle amount of the water formed in the reaction had been distilled off, 10 g of titanium tetrabutylate were added. After the acid number AN had reached a value of less than 1, the excess butanediol was distilled off under reduced pressure until an OH number of 56 had been reached.

1.81 kg of this prepolymer, 1.17 kg of dimethyl terephthalate, 1.7 kg of 1,4-butanediol and 4.7 g of titanium tetrabutylate were heated to 180° C. under a nitrogen atmosphere while stirring. The methanol formed in the transesterification reaction was distilled off.

The mixture was heated to 230° C. in the course of 2 hours while increasing the stirring speed, 6.54 g of pyromellitic dianhydride were added and, after a further hour, another 0.4 g of 50% strength aqueous phosphorous acid was introduced. At the end of the reaction, the melt was cooled to 200° C. under a nitrogen atmosphere while stirring. 15 g of hexamethylene diisocyanate were then added in 4 portions in the course of 40 minutes. The resulting polyester could be granulated.

| | |
|---|---|
| OH number = | 2 mg KOH/g |
| AN = | 5.5 mg KOH/g |
| $M_n$ = | 14,320 |
| $M_w$ = | 98,350 (GPC) |
| Melting point $T_m$ = | 98° C. |
| Glass transition temperature Tg = | −31° C. (DSC, cooled rapidly from 190° C.) |

EXAMPLES 1 to 12

Production of Films

PE1 and PE2 were mixed with different amounts of B as a mixture of granules at various melt temperatures and were extruded to give blown films. A transparent film free of melt fracture was obtained in every case.

Comparative Examples V1 to V5

The procedure was similar to that of Examples 1 to 12, but without the addition of the polyester B.

A film exhibiting pronounced melt fracture was obtained in every case.

The test parameters and the materials used are listed in Table 1.

TABLE 1

| Example | Component A) | Component B) | Melt temperature [° C.] | Die diameter [mm] | Die gap [mm] | Output [kg/h] |
|---|---|---|---|---|---|---|
| 1 | 99.0% by weight of PE1 | 1.0% by weight | 200 | 50 | 0.8 | 3 |
| 2 | 99.0% by weight of PE1 | 1.0% by weight | 200 | 50 | 0.8 | 8 |
| 3 | 99.5% by weight of PE1 | 0.5% by weight | 200 | 50 | 0.8 | 3 |
| 4 | 99.5% by weight of PE1 | 0.5% by weight | 200 | 50 | 0.8 | 8 |
| 5 | 99.7% by weight of PE1 | 0.3% by weight | 200 | 50 | 0.8 | 3 |
| 6 | 99.7% by weight of PE1 | 0.3% by weight | 200 | 50 | 0.8 | 8 |
| 7 | 99.0% by weight of PE2 | 1.0% by weight | 180 | 150 | 1 | 25 |
| 8 | 99.0% by weight of PE2 | 1.0% by weight | 200 | 150 | 1 | 25 |
| 9 | 99.0% by weight of PE2 | 1.0% by weight | 225 | 150 | 1 | 25 |
| 10 | 99.0% by weight of PE2 | 1.0% by weight | 180 | 150 | 1 | 80 |
| 11 | 99.0% by weight of PE2 | 0.5% by weight | 200 | 150 | 1 | 80* |
| 12 | 99.0% by weight of PE2 | 1.0% by weight | 225 | 150 | 1 | 80 |
| V1 | 100.0% by weight of PE1 | — | 200 | 50 | 0.8 | 3 |
| V2 | 100.0% by weight of PE2 | — | 180 | 150 | 1 | 25 |
| V3 | 100.0% by weight of PE2 | — | 200 | 150 | 1 | 25 |
| V4 | 100.0% by weight of PE2 | — | 225 | 150 | 1 | 25 |
| V5 | 100.0% by weight of PE2 | — | 200 | 150 | 1 | 80 |

*The pressure in the processing machine decreased from 480 bar to 350 bar (compared with V5)

EXAMPLE 13

Production of Bottles

99% by weight of PE3 together with 1% by weight of B as a mixture of granules were blow-molded to 300 ml bottles at a melt temperature of 200° C. The melt pressure decreased from 120 bar to 105 bar compared with a bottle comprising 100% by weight of PE3.

The bottles exhibited better surface gloss, and the stress crack resistance test indicated a 20% longer life than bottles comprising 100% by weight of PE3.

EXAMPLE 14

Production of Extruded Films 99.5% by weight of PE2 were extruded with 0.5% by weight of B at a melt temperature of 260° C. on a flat film extrusion line having a slot die of 900 mm. No melt fracture occurred even at an output of 100 kg/h, whereas a film comprising 100% by weight of PE exhibited pronounced melt fracture at an output as low as 30 kg/h.

We claim:

1. A thermoplastic molding material consisting essentially of

A) from 95 to 99.99% by weight of an ethylene polymer and

B) from 0.01 to 5% by weight of a thermoplastic polyester having a melting point of less than or equal to 150° C., wherein the thermoplastic polyester B) is obtained by reacting a composition consisting essentially of $B_1$) from 30 to 60% by weight of a mixture consisting essentially of $B_{11}$) from 30 to 70% by weight of adipic acid, the ester-forming derivatives thereof or a mixture thereof, $B_{12}$) from 30 to 70% by weight of terephthalic acid, the ester-forming derivatives thereof or a mixture thereof and $B_{13}$) from 0 to 5% by weight of a compound having at least three groups capable of ester formation, $B_2$) from 40 to 70% by weight of a dihydroxy compound of 2 to 10 carbon atoms and $B_3$) from 0 to 5% by weight of isocyanates, divinyl ethers, 2,2'-bisoxazolines or a mixture thereof, said thermoplastic polyester comprising polymer units formed from component $B_{13}$) or polymer units formed from component $B_3$).

2. The thermoplastic molding material defined in claim 1, wherein the thermoplastic polyester comprises polymer units formed from component $B_{13}$) and polymer units formed from component $B_3$).

3. The thermoplastic molding material defined in claim 1, wherein $B_3$) is present in from 0.01 to 3% by weight, based on the amount of B).

4. The thermoplastic molding material defined in claim 1, wherein $B_{13}$) is present in from 0.01 to 3% by weight, based on the amount of $B_1$).

5. The thermoplastic molding material defined in claim 4, wherein $B_{13}$) is a compound having from 3 to 10 groups capable of ester formation.

6. The thermoplastic molding material defined in claim 4, wherein $B_{13}$) is selected from the group consisting of tartaric acid, citric acid, malic acid, trimethylolpropane, trimethylolethane, pentaerythritol, polyether triols, glycerol, trimesic acid, trimellitic acid, trimellitic acid anhydride, pyromellitic acid, pyromellitic dianhydride, hydroxyisophthalic acid and mixtures of two or more thereof.

7. A fiber, film or molding comprising the thermoplastic molding material defined in claim 1.

8. A fiber, film or molding consisting essentially of the thermoplastic molding material defined in claim 1.

9. A method of improving the processability of an ethylene polymer without adverse effects on the surface properties, which method comprises blending the polyethylene polymer with a thermoplastic polyester in a weight ratio of polyethylene polymer to thermoplastic polyester of from 95:5 to 99.99:0.01 at a temperature of from 100 to 350° C., wherein the thermoplastic polyester has a melting point of less than or equal to 150° C. and is obtained by reacting a composition consisting essentially of $B_1$) from 30 to 60% by weight of a mixture consisting essentially of $B_{11}$) from 30 to 70% by weight of adipic acid, the ester-forming derivatives thereof or a mixture thereof, $B_{12}$) from 30 to 70% by weight of terephthalic acid, the ester-forming derivatives thereof or a mixture thereof and $B_{13}$) from 0 to 5% by weight of a compound having at least three groups capable of ester formation, $B_2$) from 40 to 70% by weight of a dihydroxy compound of 2 to 10 carbon atoms and $B_3$) from 0 to 5% by weight of isocyanates, divinyl ethers, 2,2'-bisoxazolines or a mixture thereof, and wherein said thermoplastic polyester comprises polymer units formed from component $B_{13}$) or polymer units formed from component $B_3$).

10. The method of claim 9, wherein the thermoplastic polyester comprises polymer units formed from component $B_{13}$) and polymer units formed from component $B_3$).

11. The method of claim 9, wherein $B_3$) is present in from 0.01 to 3% by weight, based on the amount of B).

12. The method of claim 9, wherein $B_{13}$) is present in from 0.01 to 3% by weight, based on the amount of $B_1$).

13. The method of claim 12, wherein $B_{13}$) is a compound having from 3 to 10 groups capable of ester formation.

14. The method of claim 12, wherein $B_{13}$) is selected from the group consisting of tartaric acid, citric acid, malic acid, trimethylolpropane, trimethylolethane, pentaerythritol, polyether triols, glycerol, trimesic acid, trimellitic acid, trimellitic acid anhydride, pyromellitic acid, pyromellitic dianhydride, hydroxyisophthalic acid and mixtures of two or more thereof.

* * * * *